United States Patent [19]

Ehlen et al.

[11] 4,159,144
[45] Jun. 26, 1979

[54] VEHICLE BODY SUNROOF

[75] Inventors: Benedict N. Ehlen, Royal Oak; Joseph F. Koral, Sterling Heights; Frederick C. Willenberg, Mt. Clemens, all of Mich.

[73] Assignee: General Motors Corporation, Detroit, Mich.

[21] Appl. No.: 829,726

[22] Filed: Sep. 1, 1977

[51] Int. Cl.² ............................................. B60J 7/04
[52] U.S. Cl. ............................................. 296/137 E
[58] Field of Search ........... 296/137 E, 137 F, 137 G, 296/137 H

[56] References Cited
U.S. PATENT DOCUMENTS

| 3,078,122 | 2/1963 | Werner | 296/137 E |
| 3,572,822 | 3/1971 | Schmid | 296/137 F |
| 3,960,403 | 6/1976 | Carella et al. | 296/137 E |
| 4,039,222 | 8/1977 | Wolf et al. | 296/137 E |

Primary Examiner—Joseph F. Peters, Jr.
Assistant Examiner—Gene A. Church
Attorney, Agent, or Firm—Charles E. Leahy

[57] ABSTRACT

A vehicle body sunroof module includes a stamped sheet metal pan having a forward portion with an opening registering with an opening of the roof and a rearward portion located rearward the roof opening to store the closure panel in its open position. The pan has a generally planar base wall which extends generally parallel to the roof and an upstanding peripheral flange which stiffens the pan against flexure. The flange has a discontinuity, preferably in the form of a pleat, located generally adjacent the juncture between the forward and rearward pan portions to permit flexure of the pan about a transverse axis and mounting of the forward and rearward portions in disparate planes to conform with the contour of a particular roof. A guide track is mounted on the flange along each side of the pan and receives a slide or roller connected with the closure panel to support the closure for sliding movement between open and closed positions. Each guide track has separate forward and rearward segments which are mounted on the flange by slotted connection and are hingeably interconnected allowing the track segments to pivot relative one another about a transverse axis for mounting in disparate planes.

3 Claims, 5 Drawing Figures

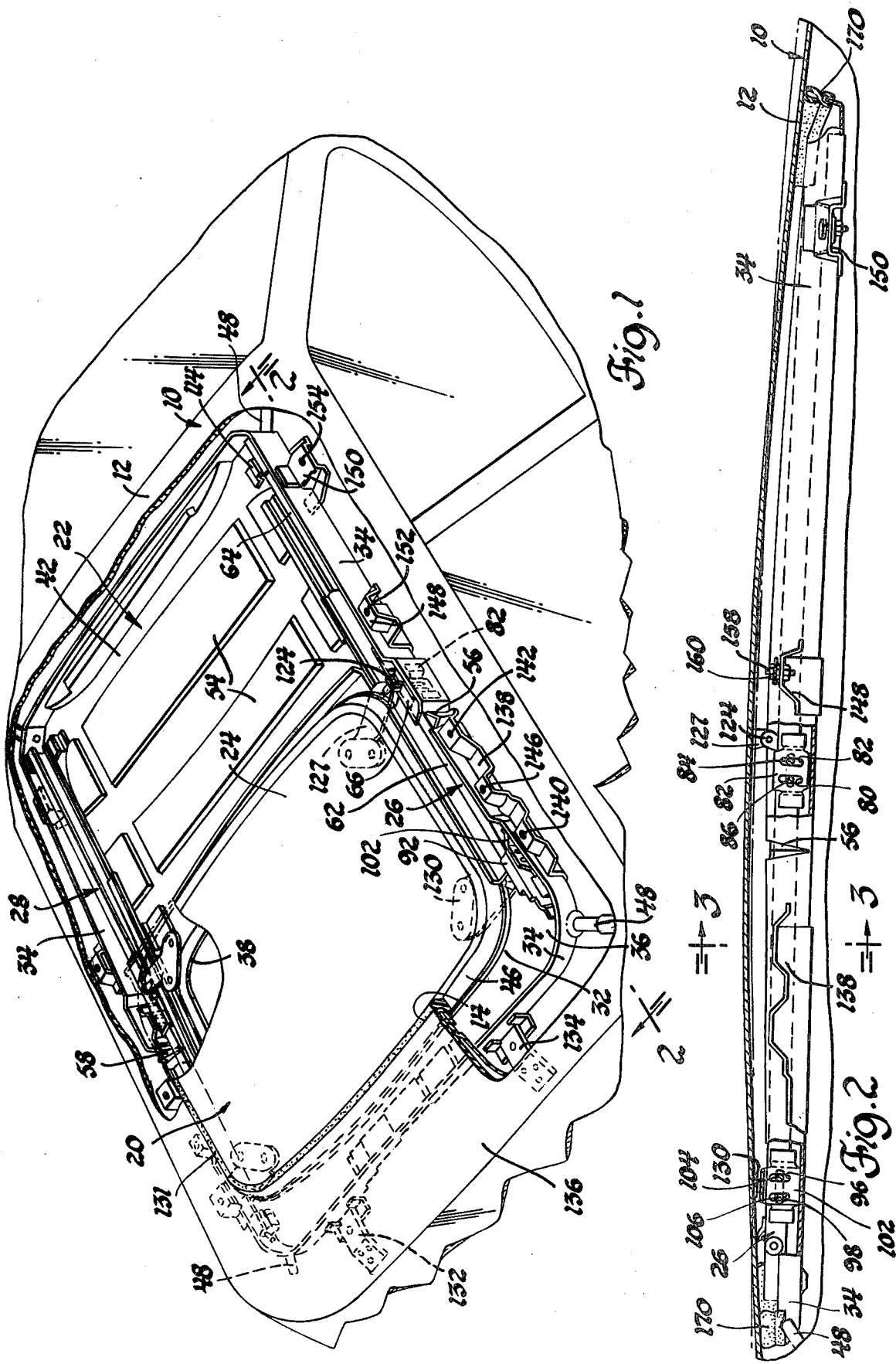

VEHICLE BODY SUNROOF

The invention relates to a vehicle body sunroof and more particularly provides a modular sunroof installation adapted to fit disparate roof contours.

It is known to provide a modular sunroof installation wherein a frame, a guide track, and a closure panel are preassembled as a module for attachment to a vehicle body.

It is also known that vehicle body sunroofs require provision for vertical adjustment of the closure panel to obtain proper fit and sealing of the closure panel to roof.

Furthermore, it is known that the side view curvature of vehicle body roof structures varies between body styles and that such variations limit the interchangeability of sunroof modules between vehicle bodies having varied roof contours.

The present invention provides a new and improved vehicle body sunroof module which provides interchangeable installation in vehicle bodies having disparate roof contours.

According to the invention, a vehicle body sunroof module includes a stamped sheet metal pan having a forward portion with an opening registering with the opening of the roof structure and a rearward portion located rearward the roof opening to store the closure panel in its open position. The pan has a generally planar base wall which extends generally parallel to the roof and an upstanding peripheral flange which stiffens the pan against flexure. The peripheral flange has a discontinuity, preferably in the form of a pleat, located generally adjacent the juncture between the forward and rearward pan portions to permit flexure of the pan about a transverse axis and mounting of the forward and rearward portions in disparate planes to conform with the contour of a particular roof structure. A guide track is mounted on the stiffening flange along each side of the pan and receives a slide or roller connected with the closure panel to support the closure panel for fore and aft movement between positions opening and closing the roof opening. Each of the guide tracks has separate forward and rearward segments which are hingeably interconnected by a telescoping connector sleeve which allows the track segments to pivot relative one another about a transverse axis. The guide track segments are mounted on the stiffening flange of the pan by a slotted connection which allows independent vertical adjustment of the front and rear segments. Thus, the forward and rearward portion of the pan and the forward and rearward segments of the guide tracks may be mounted in disparate planes to fit the contour of the roof structure and the roof opening.

These and other objects, features and advantages of the invention will become apparent upon consideration of the specification and the appended drawings in which:

FIG. 1 is a perspective view of a vehicle body roof structure having a sunroof module according to the invention;

FIG. 2 is a side elevation view of the vehicle body roof structure and sunroof module taken in the direction of arrows 2—2 of FIG. 1;

Figure 3:
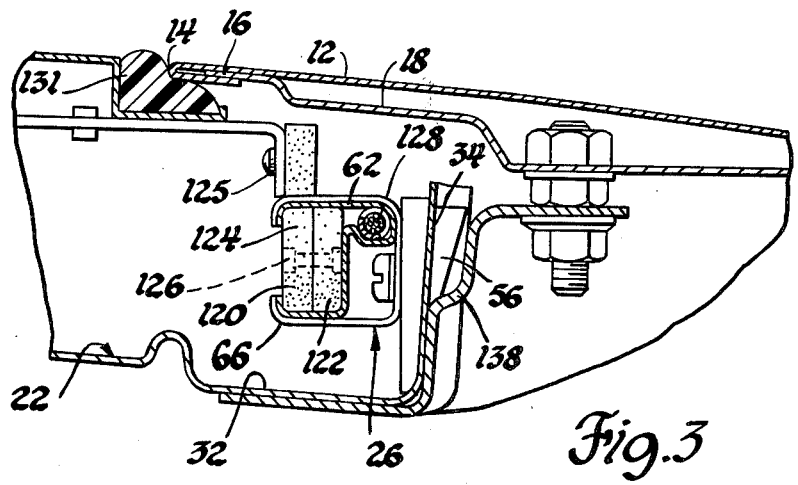
FIG. 3 is a sectional view taken in the direction of arrows 3—3 of FIG. 2.

Referring to FIG. 1, a vehicle body roof structure 10 includes a roof outer panel 12 having an opening 14 in the forward portion thereof to generally overlie the front seat of the motor vehicle. As best seen in FIG. 3, the opening 14 is provided by hem flanging the roof outer panel 12 over the edge 16 of a roof reinforcement panel 18.

A sunroof module, indicated generally at 20, includes a stamped sheet metal pan 22, a closure panel 24 and a pair of laterally spaced guide track assemblies 26 and 28 which are preassembled as a module for subsequent installation and attachment to the roof structure 10.

Referring again to FIG. 1, the stamped sheet metal pan 22 includes a generally planar base wall 32 and an integral peripheral stiffening flange 34 which extends around the four edges of the base wall 32. The pan 22 includes a forward portion 36 having an opening 38 therein which registers with the roof panel opening 14 and a rearward portion 42. The forward portion 36 is stiffened by a flange 46 which surrounds the opening 38 and cooperates with the peripheral stiffening flange 34 to define therebetween a water drain channel which is connected with drain conduits 48 provided at each corner of the pan 22. The base wall 32 is stiffened at its rearward portion 42 by a plurality of stamped stiffening ribs 54.

The stiffening flange 34 of pan 22 has discontinuities 56 and 58, preferably in the form of V-shaped pleats which project laterally outward from the stiffening flange 34 adjacent the juncture between the forward portion 36 and rearward portion 42. The pleats 56 and 58 maintain the watertight continuity of the flange 34 but lessen the stiffness sufficiently to provide a transversely extending flexure axis about which the pan 22 can yield allowing its forward portion 36 and rearward portion 42 to assume mounting positions in disparate planes which are angularly disposed relative one another as will be described hereinafter.

Figure 5:
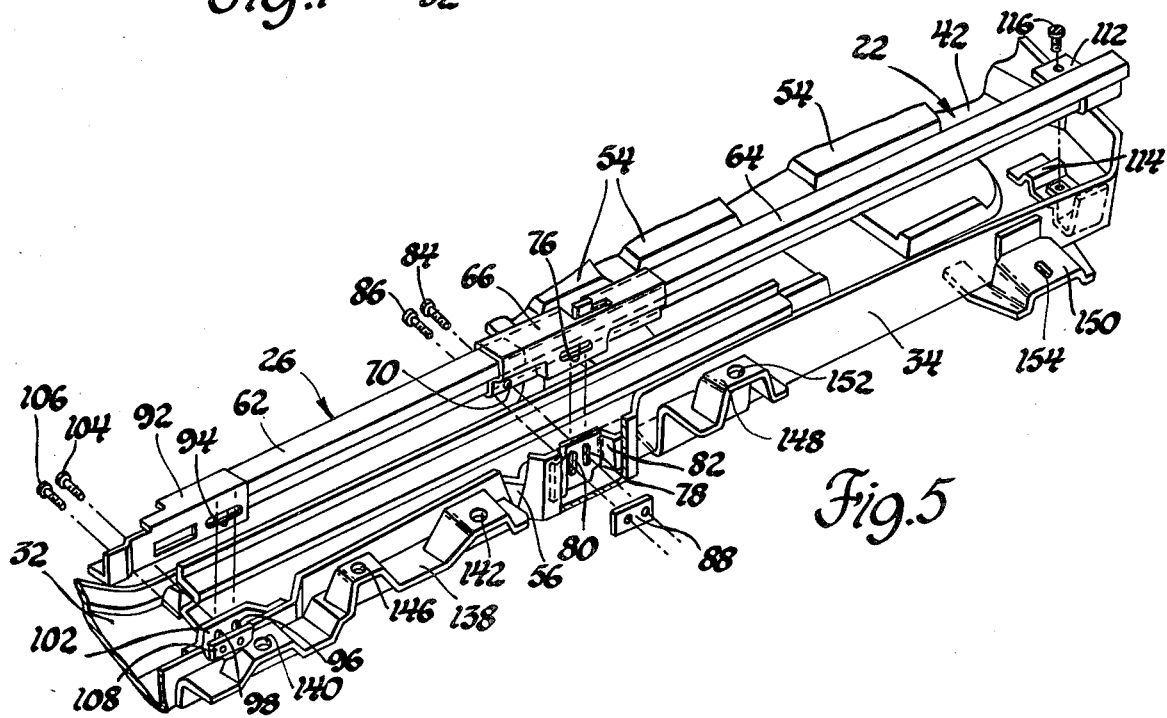
FIG. 5 is an enlarged fragmentary view of FIG. 1 but showing the guide track assembly in exploded view.

Referring to FIGS. 1 and 5, it is seen that the track assembly 26 includes a forward segment 62 and a rearward segment 64 which are joined together by a connector sleeve 66 which telescopically receives the forward end of rear segment 64 and the rearward end of forward segment 62. As best seen in FIG. 5, the forward segment 62 extends within the connector sleeve 66 for a relatively short distance and the forward segment 62 and connector sleeve 66 are pivotally joined together by coining a depression 70. In the alternative, a screw or rivet could be positioned in aligned apertures of the forward segment 62 and connector 66 to provide the pivoting hinge connection.

Figure 4:
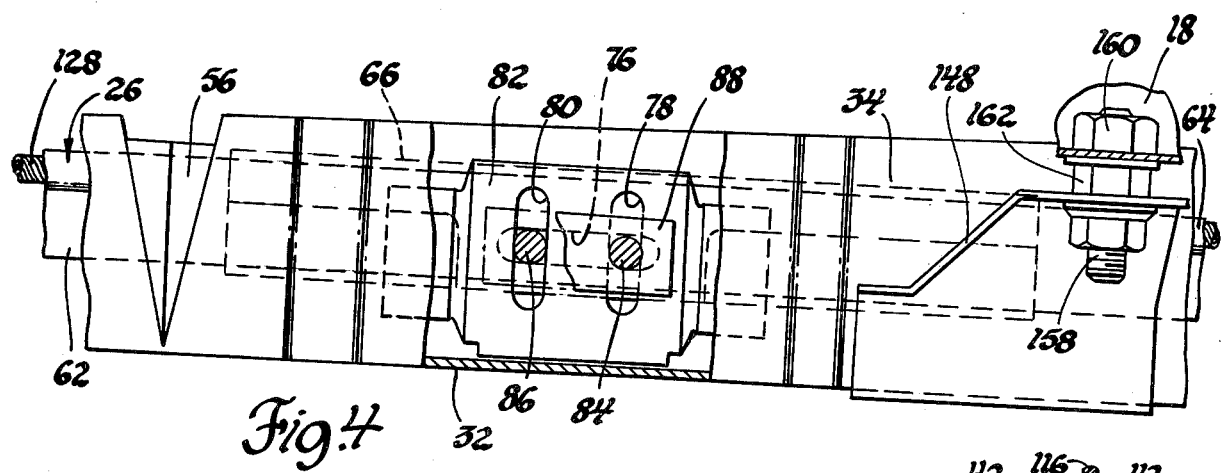
FIG. 4 is an enlarged fragmentary side elevation view of FIG. 2.

As seen in FIGS. 4 and 5, the connector sleeve 66 has a longitudinally extending slot 76 which aligns with vertically extending slots 78 and 80 provided in a bracket 82 welded to the pan stiffening flange 34. A pair of screws 84 and 86 extend through the slot 76 of the connector sleeve 66 and the slots 78 and 80 of bracket 82 for threaded engagement in a threaded plate 88 to attach the connector sleeve 66 to the pan 22. A bracket 92 is attached to the forward end of forward segment 62 and has a slot 94 which aligns with vertical slots 96 and 98 of a bracket 102 welded to stiffening flange 34. Screws 104 and 106 extend through the slots and threadedly engage a threaded plate 108.

It will be understood that the aforedescribed slotted connections between the track assembly 26 and the pan 22 allow longitudinal and vertical adjustment of the track assemblies relative the pan 22. The rearward segment 64 has a bracket 112 welded thereto and attached to a mating bracket 114 of pan 22 by a screw 116. As seen in FIGS. 2 and 5, the assembled relationship between the track assembly 26 and the pan 22 is such that the pivoting connection between the track segments is generally transversely aligned with the pleat 56 provided in the stiffening flange 34. The foregoing description, although directed to the track assembly 26 at the left-hand side of the vehicle body is equally descriptive of the guide track assembly 28 at the right-hand side of the vehicle body.

Referring to FIG. 3, it is seen that the forward segment 62 of track assembly 26 slidably receives a slide assembly 120 including a slide 122 having one end of a link 124 pivotally attached thereto by a pin 126. The other end of link 124 has a headed portion 125 which pivotally engages a closure panel mounting bracket 127 which is suitably attached to the rear end of closure panel 24. The track assembly 26 also slidably mounts a drive cable 128 which is attached to slide 122 to drive the closure panel 24 between its forward closed position and its rearward open position. A similar closure panel mounting bracket 130, FIG. 1, is connected between the forward end of closure panel 24 and a forward slide assembly, not shown, mounted in the track assembly 26. Reference may be had to U.S. Pat. No. 3,981,531, entitled "Vehicle Body Sunroof", Joseph F. Koral et al, issued Sept. 21, 1976, for a detailed description of the manner in which the drive cable, slide assemblies and associated mechanism move the closure panel fore and aft as well as raise the panel vertically to compress seal 131 carried by the panel against the roof panel 12.

Referring again to FIG. 1, it is seen that the pan 22 has mounting brackets 132 and 134 welded to the forward end thereof and adapted for bolting to the windshield header structure 136 of the vehicle body. At the left-hand side of the pan 22 a bracket 138 is welded to the pan forward portion 36 and provides mounting bolt apertures 140 and 142. The bracket 138 also has a guide pin aperture 146 which aligns with an aperture in the roof reinforcement panel 18 and receives a guide pin for locating the module assembly 20 relative the vehicle body structure 10 during assembly. Additional brackets 148 and 150 are welded to the pan rearward portion 42 and provide mounting bolt apertures 152 and 154. Additional mounting brackets identical with brackets 138, 148 and 150 are provided at the right-hand side of the pan 22.

Referring to FIGS. 3 and 4, it is seen that a bolt 158 is attached to the roof reinforcement panel 18 by nuts 160 and 162. The bolt 158 extends through the bolt aperture 152 and receives a nut 160. Similar bolt connections are made between the mounting brackets 138 and 150 and the roof reinforcement panel 18. As best seen in FIG. 3, it will be understood that the bolting of the pan 22 to the roof reinforcement panel 18 will cause the pan 22 to flex about a transverse axis at the pleats 56 and 58 so that the pan forward portion 36 assumes a plane consistent with the contour of roof structure 10 adjacent the roof opening 14 while the pan rearward portion 42 is permitted to assume a mounting location in a disparate plane determined by the roof structure curvature overlying that portion of the module 20. For example, the module may be fitted to a roof structure having the flatter contour of the dash-dot line in FIG. 3. A seal 170, FIG. 2, seats between the stiffening flange 34 and the roof outer panel 12 to seal against leaks and noise and provide a line of contact by which the module 20 lends support to the roof structure.

Upon accomplishment of the aforedescribed assembly of the module into the roof structure 10, the mounting screws 84, 86, 104 and 106 may be loosened to permit vertical and longitudinal movement of the track to obtain a preferred fit of the closure panel 24 relative the roof opening 14. Vertical adjustment of the forward end of forward segment 62 by raising and lowering the bracket 92 adjusts the closed position of the forward end of the closure panel 24 to obtain a desired compression of the seal 131 carried on a closure panel 24 against the hem flange of roof outer panel 12 defining the roof opening. Likewise vertical adjustment of the connector sleeve 66 will adjust the rearward end of forward track segment 62 and the forward end of the rearward track segment 64 to obtain a desired compressive fit of the seal 131 at the rearward end of closure panel 24 with the hem flange of the roof outer panel 12. During such vertical adjustment of the track, the forward track segment 62 and rearward track segment 64 hinge relative one another within the connector sleeve 66 and assume disparate mounting planes. Vertical adjustment of the rearward end of the rearward track segment 64 is not necessary because the closure panel is merely stored in its rearward position and there is no need to obtain a precise vertical adjustment.

Thus, it will be understood that the invention provides a vehicle body sunroof module having a pan and a track assembly which flex about a transverse axis to adapt the forward and rearward portions of the module to disparate mounting planes. Accordingly, the invention provides interchangeability of a standard sunroof module between vehicle bodies having various roof line curvatures while maintaining a minimum intrusion into the vehicle beneath the roof panel to maximize available occupant head room.

The embodiments of the invention in which an exclusive property or privilege is claimed are defined as follows:

1. In a vehicle body having a roof structure with a roof opening and a closure panel for selectively opening and closing the roof opening, the combination comprising: a stamped sheet metal pan having an opening adapted to register with the opening of the roof structure and a peripheral flange to stiffen the pan against flexure, said flange having a discontinuity therein at opposite sides thereof to permit flexure of the pan about a transverse axis to conform with the contour of the roof structure; mounting means attaching the pan to the roof structure; track means extending longitudinally of the pan on each side of the opening; and track engaging means connected with the closure panel at the forward and rearward ends thereof to support the closure panel for fore and aft sliding movement along the track means between open and closed positions; each of said track means having separate forward and rearward segments mounted on the pan for independent vertical adjustment whereby the open and closed position of the closure panel may be vertically adjusted to establish the closure panel in a desired position relative the roof opening and accommodate flexure of the pan.

2. In a vehicle body having a roof structure with a roof opening and a closure panel for selectively opening and closing the roof opening, the combination comprising: a stamped sheet metal pan having an opening adapted to register with the opening of the roof structure and a peripheral flange to stiffen the pan against flexure; mounting means attaching the pan to the roof structure; said flange having a pair of opposed integral V-shaped watertight pleats therein at opposite sides thereof to permit flexure of the pan to conform with the shape of the roof structure; track means extending longitudinally of the pan on each side of the opening; track engaging means connected with the closure panel to support the closure panel for fore and aft sliding movement along the track means between open and closed positions; each of said track means having separate forward and rearward segments and having a track connector adapted to telescopically receive the adjacent ends of the forward and rearward segments in a loose fitting connection whereby the track segments may be mounted in separate planes to adjust a closure panel relative the opening of the roof structure.

3. In a vehicle body having a roof structure with a roof opening and a closure panel for selectively opening and closing the roof opening, the combination comprising: a stamped sheet metal pan for attachment beneath the roof structure and having a forward portion and a rearward portion; an opening in the forward portion adapted to register with the opening of the roof structure; a plurality of mounting means acting to attach the pan to the roof structure; said pan having a peripheral flange to stiffen the pan against flexure and a pair of opposed V-shaped watertight pleats in the peripheral flange generally adjacent the juncture of the forward and rearward portions to permit flexure of the pan and mounting of the forward and rearward portions of the pan in separate planes to attain desired conformance of the pan with the shape of disparate roof structures; a track extending longitudinally of the pan on each side thereof, and track engaging means connected with the closure panel to support the closure panel for fore and aft sliding movement positions opening and closing the roof opening, each of said tracks having separate forward and rearward segments and a track connector adapted to telescopically receive the adjacent ends of the forward and rearward segments in a loose fitting connection whereby the track segments may be mounted in separate planes to adjust the closure panel relative the opening of the roof structure.

* * * * *